(12) United States Patent
Majewski et al.

(10) Patent No.: US 8,575,556 B2
(45) Date of Patent: Nov. 5, 2013

(54) METHOD TO IMPROVE THREE-DIMENSIONAL SPATIAL RESOLUTION OF GAMMA SCINTILLATION EVENTS IN PLATE SCINTILLATORS BY MEANS INVOLVING FIBEROPTIC LIGHT GUIDES

(75) Inventors: Stanislaw Majewski, Morgantown, WV (US); Raymond Raylman, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 214 days.

(21) Appl. No.: 12/927,176

(22) Filed: Nov. 9, 2010

(65) Prior Publication Data

US 2011/0266450 A1 Nov. 3, 2011

Related U.S. Application Data

(60) Provisional application No. 61/280,835, filed on Nov. 9, 2009.

(51) Int. Cl.
*G01T 1/20* (2006.01)

(52) U.S. Cl.
USPC .......................................................... 250/368

(58) Field of Classification Search
USPC .......................................................... 250/368
See application file for complete search history.

(56) References Cited

U.S. PATENT DOCUMENTS

| 4,233,619 | A | * | 11/1980 | Webb et al. | 257/680 |
| 4,675,526 | A | * | 6/1987 | Rogers et al. | 250/363.02 |
| 5,572,034 | A | * | 11/1996 | Karellas | 250/368 |
| 2009/0065705 | A1 | * | 3/2009 | Fuchs et al. | 250/370.11 |

* cited by examiner

*Primary Examiner* — David Porta
*Assistant Examiner* — Hugh H Maupin
(74) *Attorney, Agent, or Firm* — Buchanan Ingersoll & Rooney PC; Craig G. Cochenour

(57) ABSTRACT

A first embodiment can comprise increasing three-dimensional spatial resolution of gamma scintillation events in scintillator plates wherein the increase is by inserting a fiberoptic plate light guide between one or more photodetectors and the scintillator and optically coupling the fiberoptic plate light guides to the photodetectors.

14 Claims, 7 Drawing Sheets

METHOD TO IMPROVE THREE-DIMENSIONAL SPATIAL RESOLUTION OF GAMMA SCINTILLATION EVENTS IN PLATE SCINTILLATORS BY MEANS INVOLVING FIBEROPTIC LIGHT GUIDES

CROSS-REFERENCE TO RELATED APPLICATIONS

This application claims priority from provisional application No. 61/280,835 filed on Nov. 9, 2009.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

DETAILED DESCRIPTION OF THE INVENTION

Figure 1:
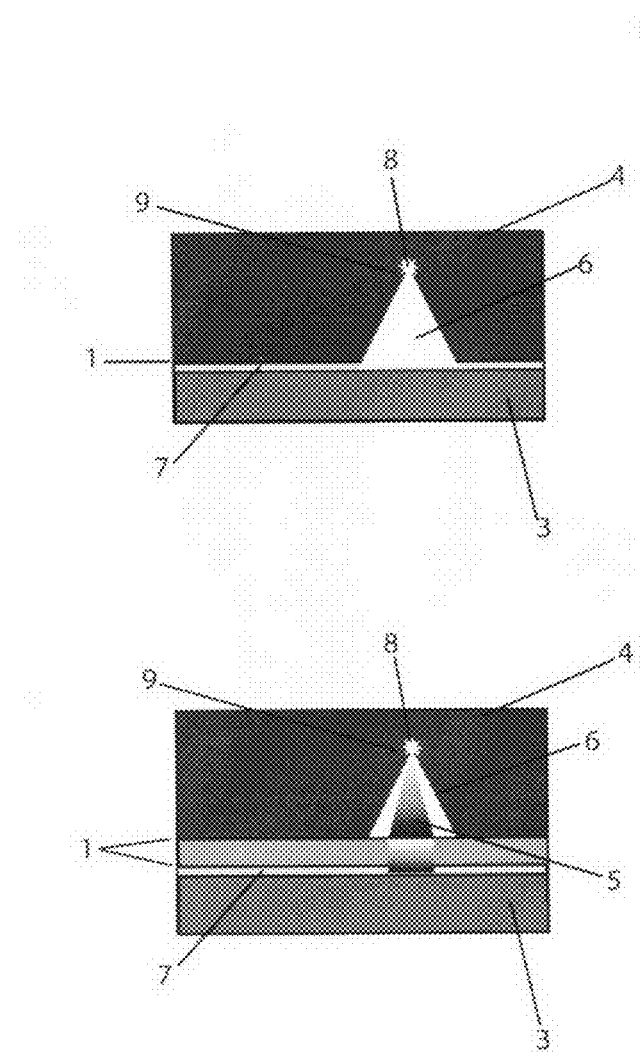
FIG. 1—Shows the known conventional design (top schematic), followed by an embodiment with the introduction of the fiberoptic light guide or fiberoptic plate (FOP)

To achieve high intrinsic spatial resolution in scintillation modules used in PET and SPECT detectors, the scintillator sensors are typically divided into arrays of small pixels. By this mechanical and optical subdivision, the spread of scintillation light for each scintillation event is highly limited which results in more precise definition of the location of the scintillation event, therefore providing better spatial resolution. However, with the desirable resolution limit in preclinical and even in dedicated clinical imagers approaching 1 mm and beyond, the production costs of mechanical processing of small size pixel arrays become prohibitive and limit the implementation of the novel high resolution apparatus.

Another approach is to use uncut scintillation plates and apply means that would be in some manner equivalent to the effects provided by pixellation process. This primarily means limiting the light cone size when it enters the photodetector module(s) and strikes the photocathode(s). Some new now tested approaches (Hamamatsu, Japan) produce separation barriers inside the scintillation plates by inducing microcracks when shining strong and focused laser beams inside the scintillator blocks. While this technique may be used on some scintillators, it is not applicable to others. Indeed one of the new very high performance scintillators, LaBr3, is so delicate that it cannot be reliably processed to achieve small size pixellation, but instead the plates and the pixels crack. In fact this scintillator currently needs to be put in an enclosure to protect it mechanically and also from humidity with an optical window between the scintillator and photodetector. The smallest pixel size achieved in LaBr3 and in small samples was 4 mm which is not sufficient for high resolution imaging. In this case external optical means, like the ones we are disclosing here, could be applied.

The proposed concept is directed towards improving the spatial resolution and its response uniformity across the whole detector module, and especially in the edge regions, while maintaining high energy resolution across the module. It is intended specifically as a remedy to minimize edge effects typically associated and well documented in multiple prior studies when utilizing plate scintillators.

The novel use and the method is to insert and optically couple 1 the optimized, and in some cases specially designed, fiberoptic light guides 2 between the photodetector 3 and the scintillator plate 4. The main role of the light guide in this concept is to limit the geometrical acceptance of the scintillation light cone 6, produced in the scintillation plate, at the photodetector surface level or the photodetector's optical window 7. The gamma ray 8 is depicted at the scintillation point 9 in the drawings. By its limited angular acceptance, and therefore by accepting only the core of the initial light cone, the size of the spot of scintillation light impinging on the photocathode surface is smaller and definition of its center of gravity is less impacted by statistical fluctuations of the scintillation light distribution at the edges of the original light cone. Also, this limited light cone 5 interacts less with the side walls of the scintillation plate and therefore the edge effects are minimized.

FIG. 1 shows the known conventional design (top schematic), followed by an embodiment with the introduction of the fiberoptic light guide or fiberoptic plate (FOP) 2 window between the scintillator and the photodetector (bottom schematic). The FOP limits (or filters) the size of the accepted scintillation light cone at the photocathode surface, while accepting most of the photons in the central (core) region of the original light cone that would be otherwise transmitted to the photodetector in the known design.

Figure 2:
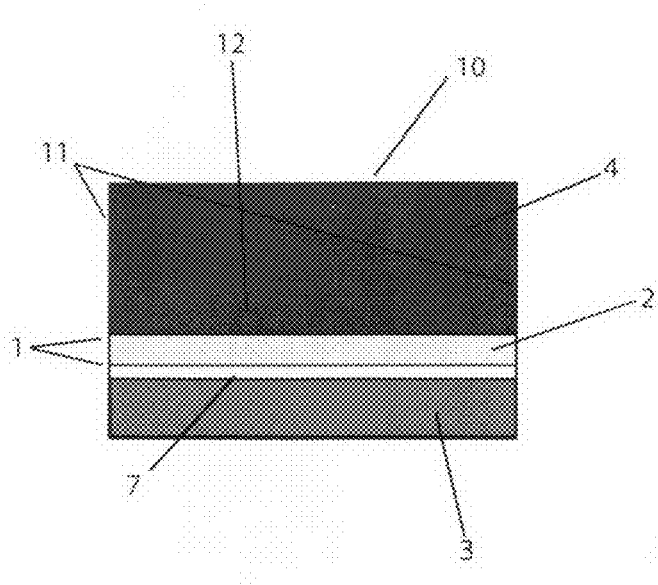
FIG. 2—Shows an embodiment with treated surfaces
Figure 3:
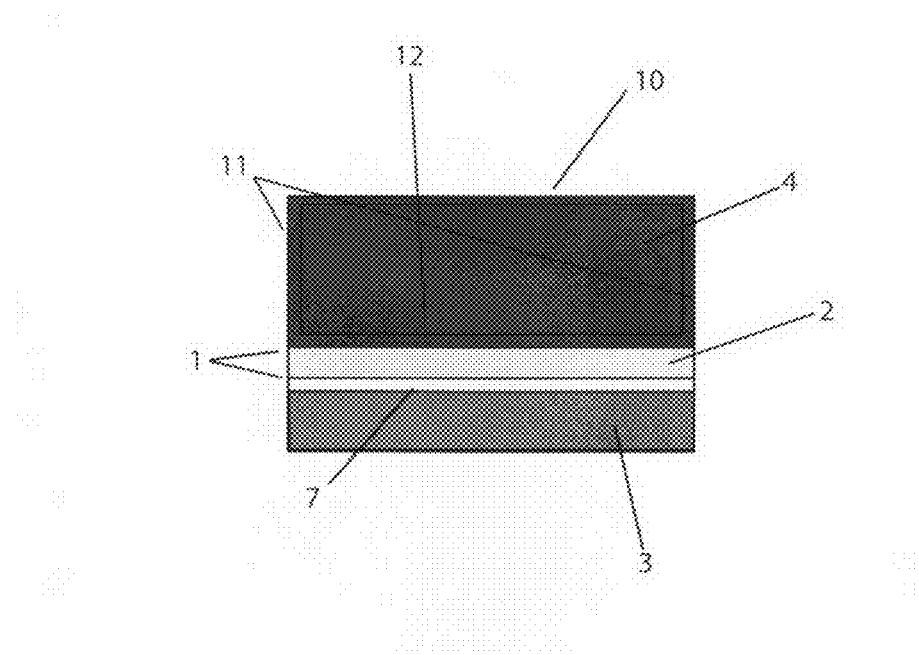
FIG. 3—Shows an embodiment with treated surfaces and which is hermetically sealed FIG. 4—Shows schematics with two opposite sides of the scintillator plate coupled to photodetectors FIG. 5—Shows a schematic with four sides of the scintillator plate coupled to photodetectors FIG. 6—Shows an embodiment with asymmetrical double-sided coupling utilizing a thinner photodetector variant installed on the incoming front side of the scintillator plate, while the back side is equipped with a larger and potentially more economical photodetector type FIG. 7—Shows an embodiment utilizing four photodetectors

Additional accompanying means to enhance this restricted light collection, used together in this conceptual package are:

scintillator plate surface treatments for top surface 10 and side surfaces 11, depending on particular photodetector structure. The bottom surface of the scintillator plate 12 is labeled in FIGS. 2 and 3 and may also utilize surface treatments. Surface treatments are used to optimize the spatial resolution by increasing or decreasing reflectivity of the surfaces of the scintillator plate. One embodiment is to decrease side surface reflection by using a rough, black, non-reflective surface treatment.

Another embodiment is to increase top surface reflection by using a polished, white, highly reflective surface treatment. Surface treatments may also be used to hermetically seal a hygroscopic scintillator.

wet optical coupling to the photodetector module(s) and the scintillator eliminates the refraction of air layer(s) where the photodetector modules, the FOP, and the scintillator plates adjoin. Through wet optical coupling using known substances such as coupling grease, the refraction caused by air between components may be removed or lessened.

structure of the photodetector modules with sensors extending to the very edges of the scintillation plate (no edge dead zones in photodetectors)

flexible positional algorithm calculating the 3D position (origin) of the scintillation event in the scintillator plate, changing from one form in the central part of the plate, to other formulas when approaching edges and/or corners. The position of the center of the light cone is related to the initial position of the interaction of the 511 keV annihilation gamma ray in the scintillator. Light in the cone is coming down to the photodetector array and is spread between several photodetector elements. One of the many possible center of gravity (COG) algorithms is used to define the center of the light distribution and therefore through the back projection the position of the initial interaction event. The region where all the COG algorithms have problems are the edge regions, where the shape of the cone gets truncated due to the presence of the edge wall of the scintillator. The quality of the COG algorithm is mostly tested in that region. The preferred algorithm is using the mathematical functional fit to the experimental distribution histogram and therefore is correcting for the truncation phenomenon at the edges. By this the useful volume of the detector is further extended towards the physical edges of the scintillation crystal, in addition to the action of the light guide.

Figure 4:
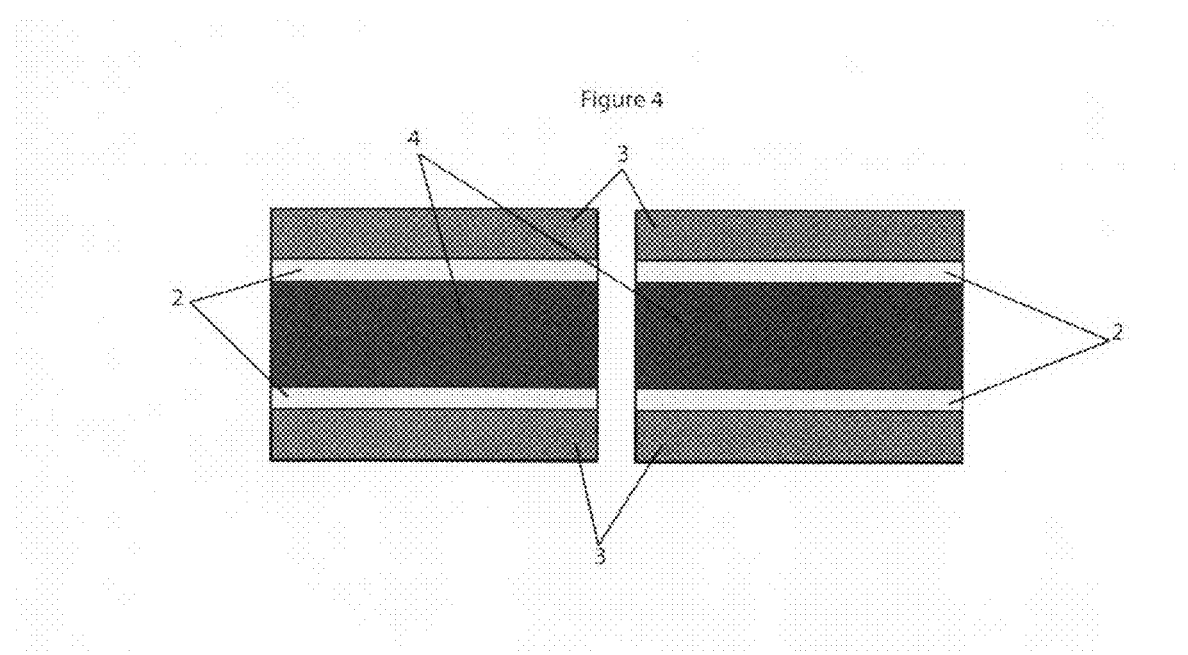
Figure 5:
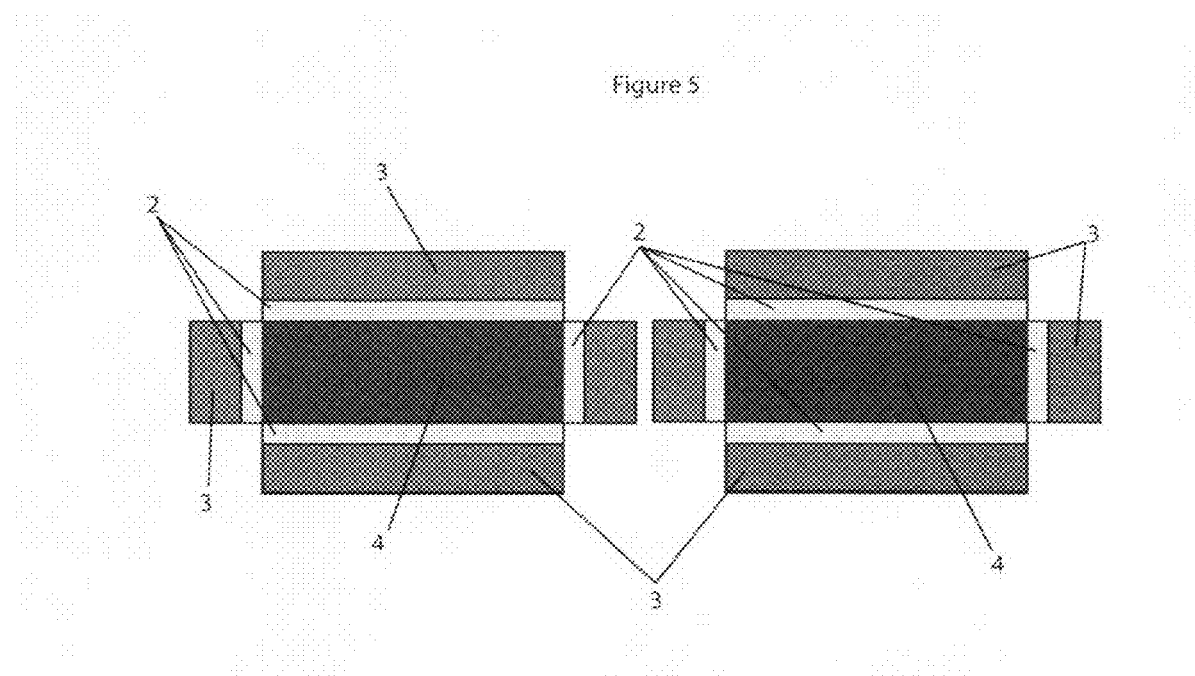

Additional embodiments of the module may vary with two, three, four, five, or six, sides readout. Such embodiments are likely to require that the photodetectors are compact. One preferred type of photodetector for this concept is the Silicon Photomultiplier which comes in different active surface sizes and can be made very compact. With one-sided readout other types of photodetectors such as more traditional position sensitive photo multiplier tubes (PMTs) can be also implemented. FIG. 4 shows schematics with two opposite sides of the scintillator plate coupled to photodetectors. The right schematic exhibits this concept in a hygroscopic scintillator which is hermetically sealed. FIG. 5 depicts a schematic with four sides of the scintillator plate coupled to photodetectors. An option with all six sides of the scintillator plate coupled to photodetectors offers the best light collection resulting in the best definition and spatial resolution of the scintillation light event's 3D positions inside the scintillator plate.

Figure 6:
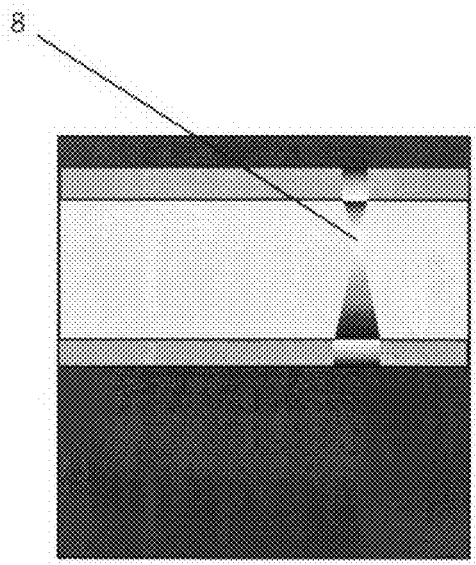
Figure 7:
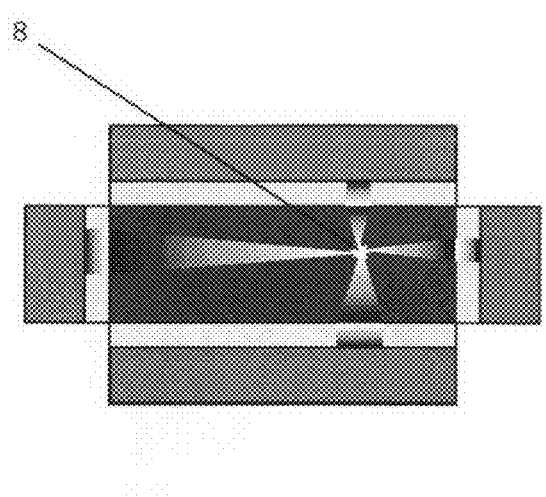

Another embodiment could utilize several types of photodetectors coupled to one scintillator plate. FIG. 6 depicts an embodiment with asymmetrical double-sided coupling utilizing a thinner photodetector variant installed on the incoming front side of the scintillator plate, while the back side is equipped with a larger and potentially more economical photodetector type, such as position sensitive PMT. Another assymetrical embodiment may use odd numbers of one type or varying types of photodetectors coupled to the scintillator plate.

FOP come in many types, but there are two basic varieties, one without and one with black glass extramural absorber (EMA). Typically, the standard FOP does not limit the light cone sufficiently, while the one with EMA is too restrictive and the light cone size becomes too small with too much light absorbed in the FOP. Therefore, our concept calls for a special FOP with intermediate EMA absorber effect which may be achieved by properly tuning the EMA cladding material used. The cladding material typically is plastic, glass, or silica, and should have a lower refractive index than the core fiberoptic material. A range of ideal refraction for the cladding material will depend upon various factors but will be heavily dependent upon the photodetector(s) used. One embodiment of the FOP should allow good transmission of light between about 400 to about 600 nm and have a refractive index from about 1.4 to about 1.6.

Photodetector side optical windows may be used between the scintillator and the photodetector. By placing photodetector optical windows between the fiberoptic light guide and the photodetector, the light accepted by the fiberoptic light guide may be spread to better cope with insensitive areas between individual sensor elements. This spreader window may prevent too large a fraction of the light cone to fall in the dead areas, therefore assuring more uniform detector module response independently of the position of the initial scintillation light generation within the scintillation plate. One enablement of the photodetector optical windows should allow good transmission between about 400 to about 600 nm light and a refractive index from about 1.4 to about 1.6.

What is claimed is:

1. A method for improving spatial resolution comprising increasing three-dimensional spatial resolution of gamma scintillation events across the entirety of one or more scintillator plates wherein the increase is by inserting a fiberoptic plate light guide between one or more photodetectors and said one or more scintillator plates, wherein said fiberoptic plate light guide limits a geometric acceptance to a core of an initial light cone produced by said scintillator plate, and optically coupling the fiberoptic plate light guides to the photodetectors.

2. The method of claim 1 wherein the fiberoptic plate light guide is clad in materials providing an intermediate extramural absorber effect.

3. The method of claim 2 wherein the materials may be one or more of plastic, glass, silica, or other materials known in the art with a lower refractive index than the fiberoptic plate light guide.

4. The method of claim 1 wherein the scintillator plate is treated with a surface treatment of one or more of polishing, painting, or coating to increase or decrease reflectivity.

5. The method of claim 1 wherein wet optical coupling is used between one or more of the components to eliminate refraction caused by air.

6. The method of claim 1 wherein the photodetector is structured with sensors extending to the edges of the scintillator plate.

7. The method of claim 1 wherein varying algorithms calculating the three-dimensional position of a scintillation event are used depending upon the events proximity to edges and corners of the scintillator plate.

8. The method of claim 1 wherein a photodetector side optical window is utilized between the scintillator and the photodetector.

9. The method of claim 1 wherein up to six of the fiberoptic plate light guide and photodetector couplings are added to the scintillator plate.

10. The method of claim 9 wherein the couplings are added symmetrically.

11. The method of claim 9 wherein the couplings are added asymmetrically.

12. The method to of claim 1 wherein the scintillator plate is hermetically sealed for hygroscopic use.

13. The method of claim 1 wherein the photodetector is further comprised of one or more photosensor elements.

14. The method of claim 12 wherein insensitive areas between photosensor elements are polished, painted, coated, or filled with materials which increase reflection.

* * * * *